Aug. 14, 1945.   G. C. SPILLMAN   2,382,922
STRAND HANDLING APPARATUS
Filed Feb. 22, 1944   2 Sheets-Sheet 1

INVENTOR
G. C. SPILLMAN
BY
E. R. Nowlan
ATTORNEY

Aug. 14, 1945.  G. C. SPILLMAN  2,382,922
STRAND HANDLING APPARATUS
Filed Feb. 22, 1944   2 Sheets-Sheet 2
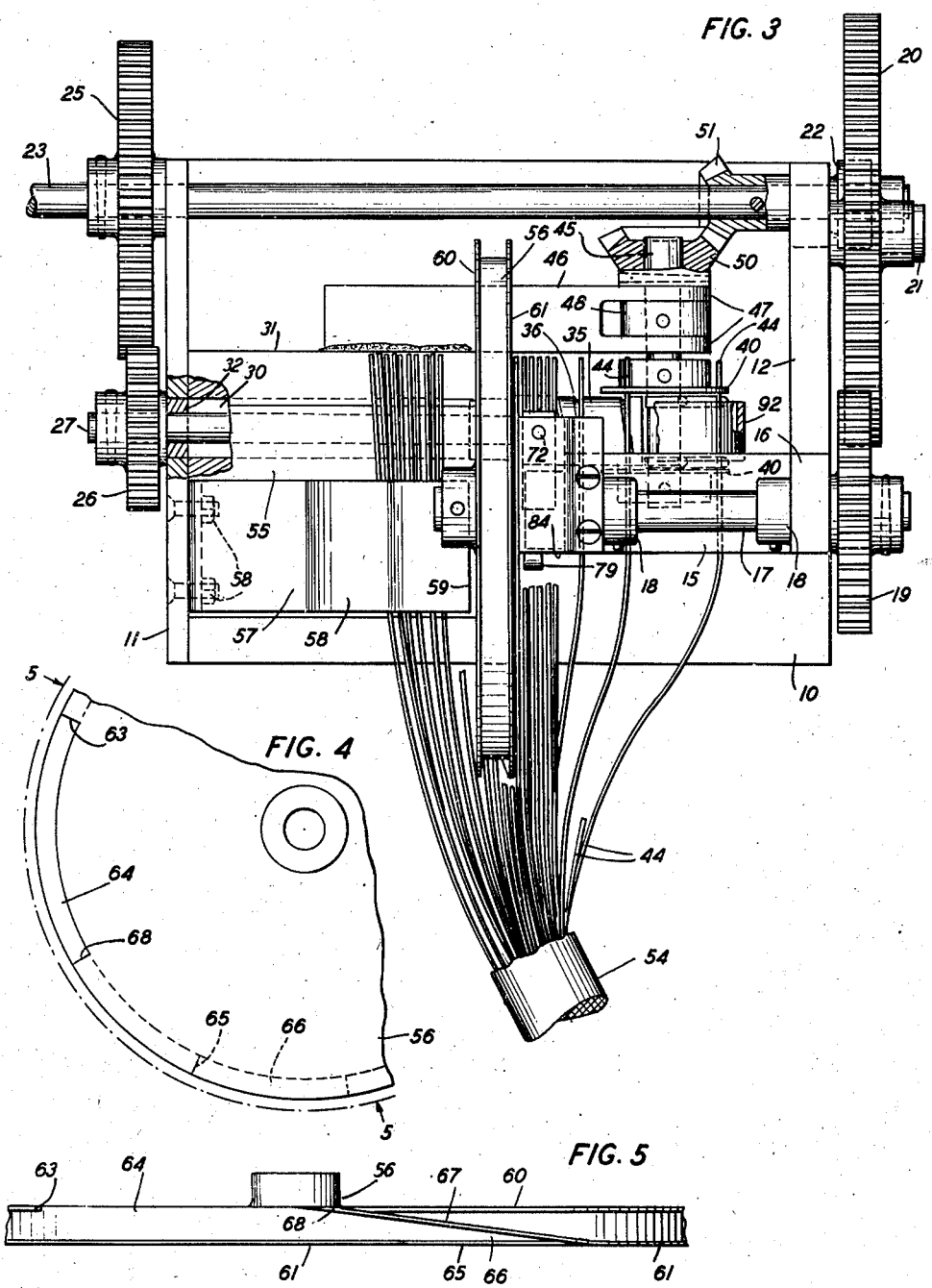
INVENTOR
G. C. SPILLMAN
BY
E. R. Nowlan
ATTORNEY Patented Aug. 14, 1945

2,382,922

UNITED STATES PATENT OFFICE 2,382,922

STRAND HANDLING APPARATUS

Gordon C. Spillman, Roselle, N. J., assignor to Western Electric Company, Incorporated, New York, N. Y., a corporation of New York Application February 22, 1944, Serial No. 523,449

13 Claims. (Cl. 140—2)

This invention relates to strand handling apparatus, and more particularly to apparatus for fanning cable strands or conductors.

During the manufacture of cables for use in the communications arts, certain tests are made thereon, and during these intervals it is necessary to fan out the ends of the strands or conductors so that they may be individually accessible for testing.

An object of the invention is to provide a strand handling apparatus which is simple in structure, efficient in operation and particularly adaptable for fanning conductor wires of communication cables.

With this and other objects in view, the invention comprises a strand handling apparatus having a rotatable feeding member adapted to select a plurality of strands from a group and feed them to an associated element formed to receive the strands singly and advance them laterally in spaced positions relative to a given location, after which the strands are moved arcuately through a given path.

Other objects and advantages will be apparent from the following detailed description when considered in conjunction with the accompanying drawings, wherein Fig. 1 is a front elevational view of the apparatus, portions thereof being broken away;

Fig. 3 is a top plan view of the apparatus, portions thereof being broken away;

Fig. 4 is a fragmentary side elevational view of the feeding wheel, and

Fig. 5 is an end elevational view of the feeding wheel, this view being taken substantially along the line 5—5 of Fig. 4.

Figure 1:
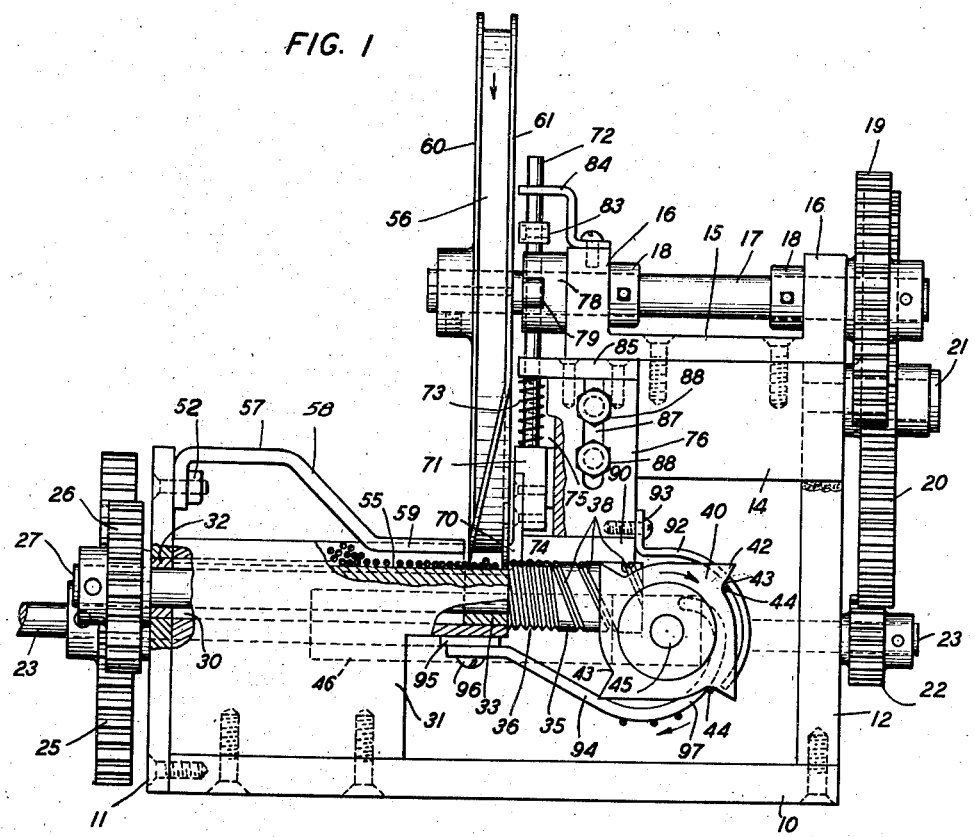

Referring now to the drawings, attention is first directed to Figs. 1 and 3, which illustrate a base 10 upon which vertical members or uprights 11 and 12 are mounted at the ends thereof. A horizontal bracket 14 is mounted upon the upright 12 by suitable means such as welding and has a bearing bracket 15 mounted thereon, with bearing portions 16 to rotatably support a shaft 17. Collars 18, fixed to the shaft 17 adjacent the bearing 16, serve to eliminate axial movement of the shaft. A gear 19 is fixedly mounted upon one end of the shaft 17 and interengages an intermediate gear 20, the latter being rotatably supported by a spindle 21 carried by the upright 12. A pinion 22 interengages the intermediate gear 20 and is fixedly mounted upon a drive shaft 23. The drive shaft 23 extends through the uprights 12 and 11, is journalled in bearings therein, and is driven by any suitable power means (not shown). A gear 25 is fixedly mounted upon the drive shaft 23 and interengages a gear 26, which is mounted upon a spindle 27. The spindle 27 extends through an aperture 30 in a table 31 and is journalled in suitable bearings 32 and 33, the former being disposed in an aperture in the upright 11.

A feeding element 35 is mounted upon or fixed to the inner end of the spindle 27 and is driven thereby. The element 35 is provided with a V-shaped spiral groove 36 adapted to receive strands or electrical conductors of a cable singly and advance them laterally in a given order. As illustrated in Fig. 1, the convolutions of the spiral groove 36 in the element 35 are closely positioned for about one third the length of the element and then open in increasingly wider spiral convolutions, as indicated at 38, to space the strands and to advance them laterally at a faster rate of speed to locate them singly adjacent the end of the element to be received by transporting elements 40. The elements 40 are of like contours, as illustrated in Fig. 1, with radial projections or fingers 42 providing strand receiving portions or pockets 43 in which the strands, identified by reference numeral 44, may be received from the element 35. The elements 40 are mounted at spaced positions upon a shaft 45 which is rotatably supported by a bracket 46 fixed to the table 31. The bracket 46 has a yoke-like portion 47 rotatably supporting the shaft 45 and having a locating collar 48 disposed between the legs thereof and fixed to the shaft to serve in locating the elements 40 at equally spaced positions upon each side of the element 35. A beveled gear 50 mounted upon the shaft 45 interengages a beveled gear 51 which is fixedly mounted upon the drive shaft 23, completing the driving means for the elements 40 so that they will be driven in synchronism with the element 35.

In the present instance the strands 44 are electrical conductors from a cable 54, which may be supported by any suitable means (not shown). The free ends of strands extend across the top of the table 31, which has an arcuate depression 55 therein adapted to conform to the periphery of a feeding wheel 56. A guide member 57, fixed as at 52 to the upright 11, is of the contour illustrated in Figs. 1 and 3, providing a portion spaced from the table 31 to facilitate in the location of the group of strands from the cable onto the table. A downwardly projecting or angular portion 58 of the member 57 serves to direct the strands downwardly into the depression or recess 55 of the table, while a forward portion 59 of the member serves to hold the strands in the depression of the table for their movement in substantially a single layer toward the feeding wheel 56.

Figure 2:
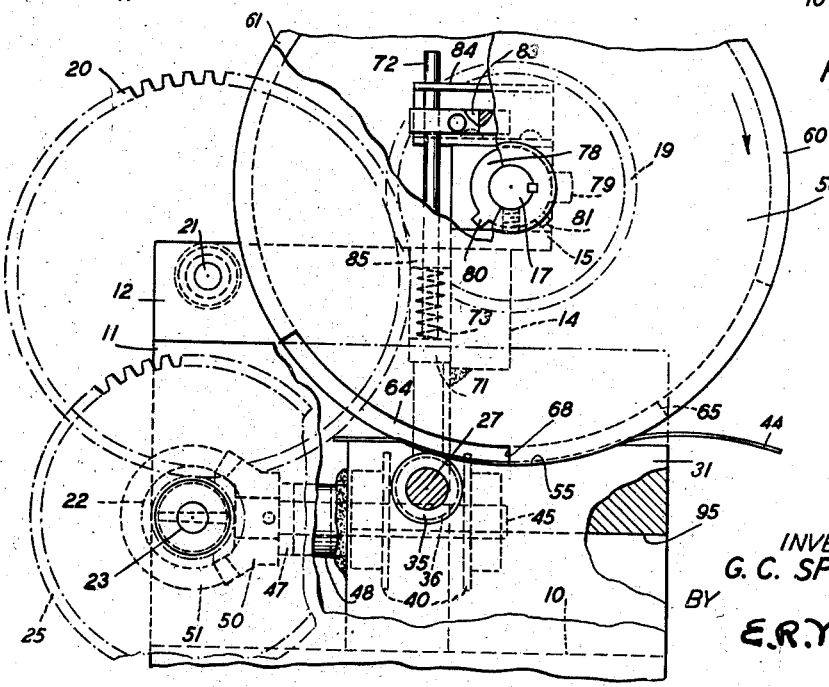
Fig. 2 is an end elevational view of the apparatus taken from the left of Fig. 1, portions thereof being broken away.

The feeding wheel 56 is fixedly mounted upon the shaft 17 and rotated thereby. Peripheral flanges 60 and 61 of the wheel 56 extend continuously about the wheel, except as illustrated in Figs. 1, 4 and 5, where the flange 60 terminates at 63, providing an inlet 64, and the flange 61 terminates at 65, providing an outlet 66. The other end of the flange 61 adjacent the outlet 66 extends transversely across the wheel, as at 67, to an edge 68, serving to select a predetermined number of the strands from the table at the inlet 64 and cause movement of the selected strands laterally through the outlet 66 to the element 35. Thus through the aid of the feeding wheel 56, a selected number of strands is transferred from the table 31 to the element 35, the flange 61, during the additional part of the revolution of the wheel, serving to maintain the selected strands in a position adjacent the spiral groove 36. This selected group of strands will be piled up at the beginning end of the element 35, adjacent to which is a reciprocable pressure element 70. The element 70 is carried by a spring pressed member 71 supported by the lower end of a rod 72 and normally urged downwardly by a spring 73. The member 71 has a tongue portion 74 receivable in a groove 75 of a supporting bracket 76 for vertical movement of the member 71 and its element 70 in a given path. Although the element 70 is normally urged downwardly to urge the selected group of strands into the convolutions of the spiral groove 36 of the element 35, means is provided to intermittently move the element upwardly and releasing it so that, through the aid of the spring 73, hammer-like blows may be applied to the strands to assure their movement into the adjacent convolutions of the spiral grooves 36. This means includes a cam 78, which is fixedly mounted upon the shaft 17 and has high portions 79, 80 and 81 (Figs. 1 and 2). It will be noted, by viewing Fig. 2, that the portion 79 of the cam is higher and wider than the portions 80 and 81, the purpose being to move the element 70 by the high portion 79 from the element 35 for the reception of the selected strands. The high portions of the cam are adapted to engage an arm 83, which is fixedly mounted upon the rod 72. The rod 72 is supported for vertical movement in brackets 84 and 85, the former being mounted upon the adjacent bearing portion 16 of the bracket 15 while the latter is mounted upon the bracket 76.

The bracket 76 has an elongate slot 87 therein to receive mounting screws 88, threadedly carried by the lateral member or bracket 14, for adjustably mounting the bracket 76 relative to the member 14. A shoe 90 mounted upon the lower end of the bracket 76, is positioned to rest upon the element 35 or be positioned closely adjacent thereto to limit the element to receive the strands 44 singly in each convolution of the spiral groove 36 and to maintain the strands therein during their advancement toward the rotary elements 40.

After the strands 44 leave the element 35 or the spiral groove 36 thereof and are picked up singly in the pockets 43 of the elements 40, a guide 92 of the arcuate contour shown in Fig. 1 and mounted at 93 upon the bracket 76, maintains the strands 44 in the pockets 43 during transporting of the strands through a given arcuate path. Another guide 94, of the contour shown in Fig. 1, is mounted beneath a projecting end 95 of the table 31, as at 96, and has a curved portion 97 extending between the shaft 45 and the guide 92 to meet the strands 44 moved arcuately by the elements 40 to remove the strands from the pockets 43 of the elements and cause them to assemble beneath the guide 94 and the projecting end 95 of the table. It will be noted that the angular relationship of the fingers 42 and the adjacent portion of the guide 94 is greater than a right angle, thus eliminating any possibility of severing the strands.

Considering now the operation of the apparatus, let it be assumed that the conductor wires of a cable are disposed upon the table 31 beneath the high portion of guide member 57. The ends of the conductors may, for desired portions of their lengths from their ends, be freed of their insulation so that, if desired, tests may be made thereon as they subsequently travel in the pockets 43 of the elements 40. The conductors are then moved toward the wheel 56 beneath the portion 59 of the guide, which will force the conductors or wires downwardly into the depression 55 of the table 31, causing them to conform to the peripheral contour of the wheel so as to be readily received in groups thereby. During each revolution of the wheel, a group of the strands will be received thereby through the inlet portion 64, dividing this group from the remaining wires by the edge 68. The diagonal portion 67 of the flange 61 of the wheel will move the selected group of wires laterally from the table 31 to a position over the element 35.

The cam 78 is mounted for rotation upon the same shaft (17) as the wheel 56 so that the high portion 79 of the cam will engage the arm 83 and move the element 70 upwardly from the element 35 so that the selected group of wires may be disposed between the wheel 56 and the adjacent end of the shoe 90. After the high portion 79 of the cam 78 moves free of the arm 83, the element 70 is forced downwardly to force the wires singly in the convolutions of the spiral groove 36. The hammer-like blows of the element 70 are repeated through the engagement of the high portions 80 and 81 with the arm 83, so as to assure feeding of the selected group of wires into the convolutions of the spiral groove prior to the time the next group of wires is to be received from the wheel 56.

The shoe 90 assures maintenance of the wires in the convolutions of the spiral groove during the advancement of the wires laterally at increasingly spaced positions relative to each other until they are received in the pockets 43 of the rotary elements 40. In the present illustration the shoe 90 is substantially resting upon the element 35. The position of the shoe relative to the element 35 depends upon the size of the strands of wires in the cable. The V-shaped cross-sectional contour of the spiral groove 36 permits use of the apparatus in handling wires of various sizes. If the wires should be larger than those illustrated, the shoe 90 may be moved upwardly the desired distance by loosening the screws 88, the accurate relationship of the shoe with respect to the element 35 being maintained so that its lower controlling surface may be parallel with the axis of the element through the aid of the elongate slot 87 associated with the screws 88. When the adjustment has been completed, the screws 88 may be tightened to hold the bracket 76 with the shoe 90 in the adjusted position. During this adjustment, the guide 92 will be moved upwardly. Adjustment of the guide may also be made through the provision of an elongate slot at its mounting screw 93, to locate the guide at the desired position to maintain the wires in the pockets 43 of the elements 40. After the wires are received in the pockets 43 of the elements 40, they are moved in definite spaced positions through an arcuate path and freed beneath means, namely the guide 94 and the table 31, including the projecting end 95 thereof, to hold these wires separate from those which have not as yet been transferred horizontally to the elements 40.

It is apparent that, through the single driving means, with positive driving connections from this driving means with the feeding wheel 56, the reciprocating element 70, the drive screw or element 35, and the rotating elements 40, there is a continuous advancement of the strands from selected groups received by the feeding wheel and moved to the element 35, where these groups are divided into individually spaced strands moving laterally at closely disposed positions, which positions are increasingly widened in approaching the end of the element 35, where they are received in the pockets 43 of the elements 40, the spacing of the wires being further increased to given spaced relative positions in which they are held as they are moved in arcuate paths by the elements 40 and disposed in a retaining means separating them from the remaining wires yet to be traversed.

Although specific improvements of the invention have been shown and described, it will be understood that they are but illustrative and that various modifications may be made therein without departing from the scope and spirit of this invention as defined by the appended claims.

What is claimed is:

1. A strand handling apparatus comprising a support for a plurality of strands, an actuable element formed to receive the strands singly, transport them laterally and simultaneously vary their distances from each other, means to actuate the element, and means to feed the strands to the element.

2. A strand handling apparatus comprising a support for a plurality of strands, a rotatable element having a spiral groove therein for transporting the strands laterally from an entrance end of the element to an exit end thereof, the convolutions of the groove opening to increasingly wider spacings as they approach the said exit end, means to feed the strands to the element, and a movable member having a projection movable between the strands adjacent the said exit end to successively remove the strands therefrom.

3. A strand handling apparatus comprising a support for a plurality of strands, a rotatable element having a spiral groove therein for transporting the strands laterally from an entrance end of the element to an exit end thereof, the convolutions of the groove opening to increasingly wider spacings as they approach the said exit end, means to feed the strands to the element, and means to substantially close the convolutions at the strands to maintain the strands in the convolutions of the groove.

4. A strand handling apparatus comprising a support for a plurality of strands, a rotatable element having a spiral groove therein for transporting the strands laterally from an entrance end of the element to an exit end thereof, the convolutions of the groove opening to increasingly wider spacings as they approach the said exit end, means to feed the strands to the element, a shoe disposed adjacent the element to maintain the strands in the convolutions of the groove, and means to urge the strands into the convolutions.

5. A strand handling apparatus comprising a stationary table for supporting a plurality of strands, a feeding wheel rotatable relative to the table to remove selected groups of the strands from the table, and means adapted to receive the strands from the feeding wheel and singly move the strands laterally at spaced positions.

6. A strand handling apparatus comprising a table for supporting a plurality of strands, a spirally grooved rotatable element adapted to receive the strands from the table and move them laterally in given spaced positions, and a feeding wheel rotatable relative to the table and adapted to transport selected groups of the strands from the table to the element.

7. A strand handling apparatus comprising a table for supporting a plurality of strands, a spirally grooved rotatable element adapted to receive the strands from the table and move them laterally in given spaced positions, a feeding wheel rotatable relative to the table and adapted to transport selected groups of the strands from the table to the element, and a reciprocable member actuable to force the strands into the convolutions of the spiral groove of the element.

8. A strand handling apparatus comprising a table for supporting a plurality of strands, a spirally grooved rotatable element adapted to receive the strands from the table and move them laterally in given spaced positions, a feeding wheel rotatable relative to the table and adapted to transport selected groups of the strands from the table to the element, a reciprocable member actuable to force the strands into the convolutions of the spiral groove of the element, and means to actuate the member.

9. A strand handling apparatus comprising a table for supporting a plurality of strands, a spirally grooved rotatable element adapted to receive the strands from the table and move them laterally in given spaced positions, a feeding wheel rotatable relative to the table and adapted to transport selected groups of the strand from the table to the element, a reciprocable member actuable to force the strands into the convolutions of the spiral groove of the element, and means to actuate the member to move it away from the element during the feeding of the groups of strands thereto and to intermediately force the strands into the convolutions of the spiral groove.

10. A strand handling apparatus comprising a table, for supporting a plurality of strands, having an arcuate recess therein, a feeding wheel rotatable relative to the table and having its periphery movable in the said recess and formed to remove selected groups of the strands laterally therefrom, and means adapted to receive the strands from the feeding wheel and move the strands laterally at spaced positions.

11. A strand handling apparatus comprising a table, for supporting a plurality of strands, having an arcuate recess therein, a feeding wheel rotatable relative to the table and having its periphery movable in the said recess and formed to remove selected groups of the strands laterally therefrom, means adapted to receive the strands from the feeding wheel and move the strands laterally at spaced positions, and means to direct the strands into the recess.

12. An apparatus for fanning strands of a cable comprising a table for supporting the strands of a cable, a feeding element actuable to remove groups of the strands from the table, a spirally grooved element actuable to receive the strands from the feeding element and move them laterally at given spaced positions, and a transporting element actuable to receive the strands singly from the grooved element and move them in spaced positions through an arcuate path.

13. An apparatus for fanning strands of a cable comprising a table for supporting the strands of a cable, a feeding element actuable to remove groups of the strands from the table, a spirally grooved element actuable to receive the strands from the feeding element and move them laterally at given spaced positions, a transporting element actuable to receive the strands singly from the grooved element and move them in spaced positions through an arcuate path, a driving means, and separate means operatively connecting the elements to the driving means to cause actuation of the elements in synchronism with each other.

GORDON C. SPILLMAN.